United States Patent [19]

Marx et al.

[11] Patent Number: 5,128,522
[45] Date of Patent: Jul. 7, 1992

[54] RESISTANCE HEATER FOR A CARRYOUT PIZZA PACKAGE OR OTHER FOOD ITEMS

[75] Inventors: Ronald P. Marx, Grand Chute; James O. Cheshire, Neenah, both of Wis.

[73] Assignee: James River Corporation of Virginia, Richmond, Va.

[21] Appl. No.: 450,082

[22] Filed: Dec. 13, 1989

[51] Int. Cl.⁵ .................. F27D 11/00; H05B 3/00; H01C 10/00
[52] U.S. Cl. ..................... 219/385; 219/387; 219/541; 219/542; 219/552; 338/195
[58] Field of Search ........... 392/435; 29/592.1, 610, 29/611, 623, 853; 99/401, 451, 450.2, 171, 174; 219/385-387, 528, 529, 544, 543, 548; 338/292, 293, 306, 307, 314, 195

[56] References Cited

U.S. PATENT DOCUMENTS

| | | |
|---|---|---|
| 2,169,594 | 8/1939 | Schellenger . |
| 2,784,287 | 12/1954 | Glynn . |
| 2,912,747 | 11/1955 | Oshry et al. ............ 29/853 |
| 2,971,073 | 8/1958 | Eisler . |
| 3,020,378 | 9/1958 | Eisler . |
| 3,026,234 | 9/1958 | Eisler . |
| 3,062,663 | 11/1958 | Furgal et al. |
| 3,100,711 | 7/1958 | Eisler . |
| 3,283,284 | 1/1962 | Eisler . |
| 3,483,358 | 4/1963 | Eisler . |
| 3,526,566 | 8/1968 | McIlvain, Jr. et al. . |
| 3,721,803 | 3/1973 | DiStefano . |
| 3,751,629 | 8/1973 | Eisler ............ 219/528 |
| 3,869,596 | 3/1975 | Howie ............ 219/543 |
| 4,134,004 | 1/1979 | Anderson et al. . |
| 4,633,068 | 12/1986 | Grise . |

Primary Examiner—Bruce A. Reynolds
Assistant Examiner—Tuan Vinh To
Attorney, Agent, or Firm—Sixbey, Friedman, Leedom & Ferguson

[57] ABSTRACT

An improved heaterboard, and method and apparatus for producing same is disclosed herein. A foil layer is bonded to a paperboard substrate and a circuit path is cut in the foil layer to define a heating circuit. In a preferred method, the circuit is defined by cut scores and short-circuiting across the cut scores is prevented by a reverse scoring operation in which the circuit pattern is scored in the surface of the heaterboard opposite the surface having the foil heating layer thereon. Various heaterboard circuit patterns and an apparatus for forming heaterboards are also disclosed.

13 Claims, 8 Drawing Sheets

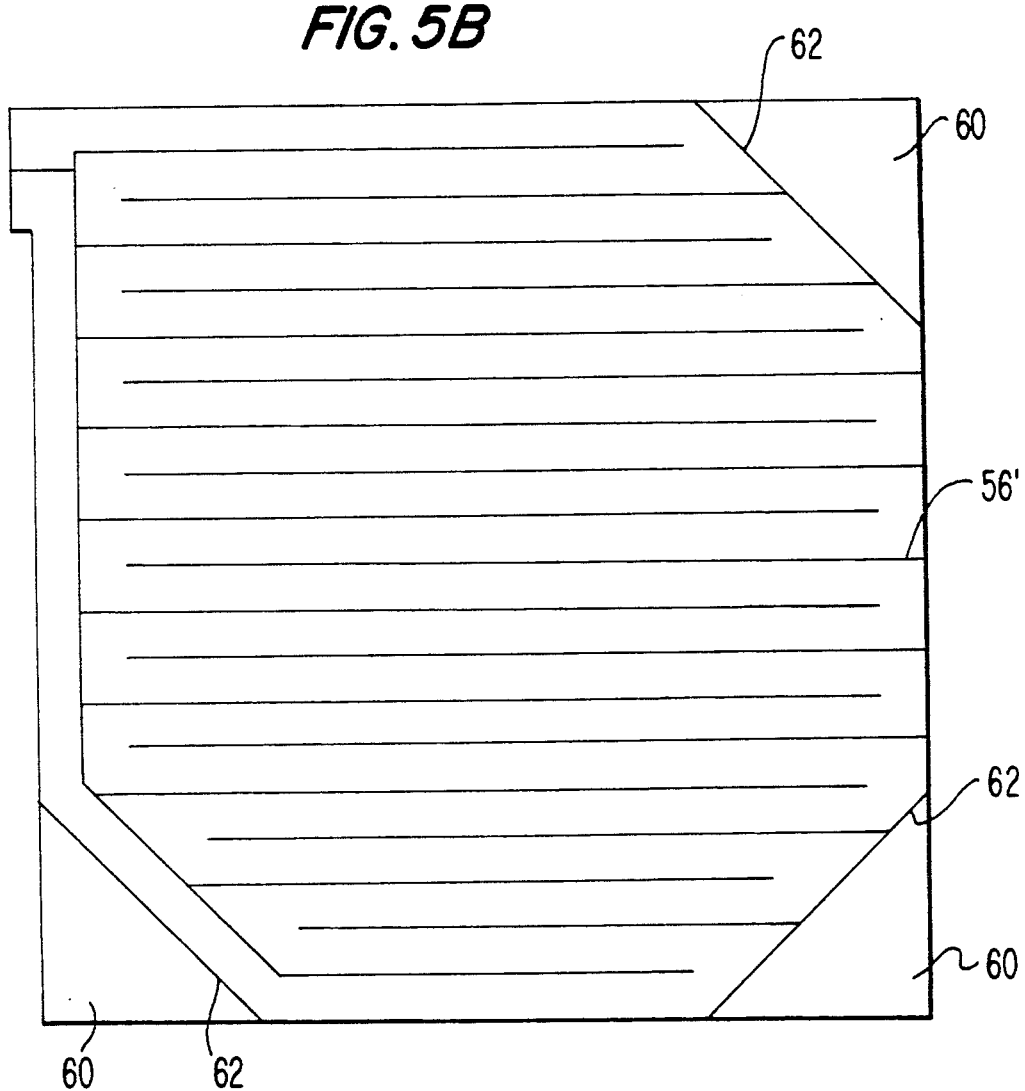

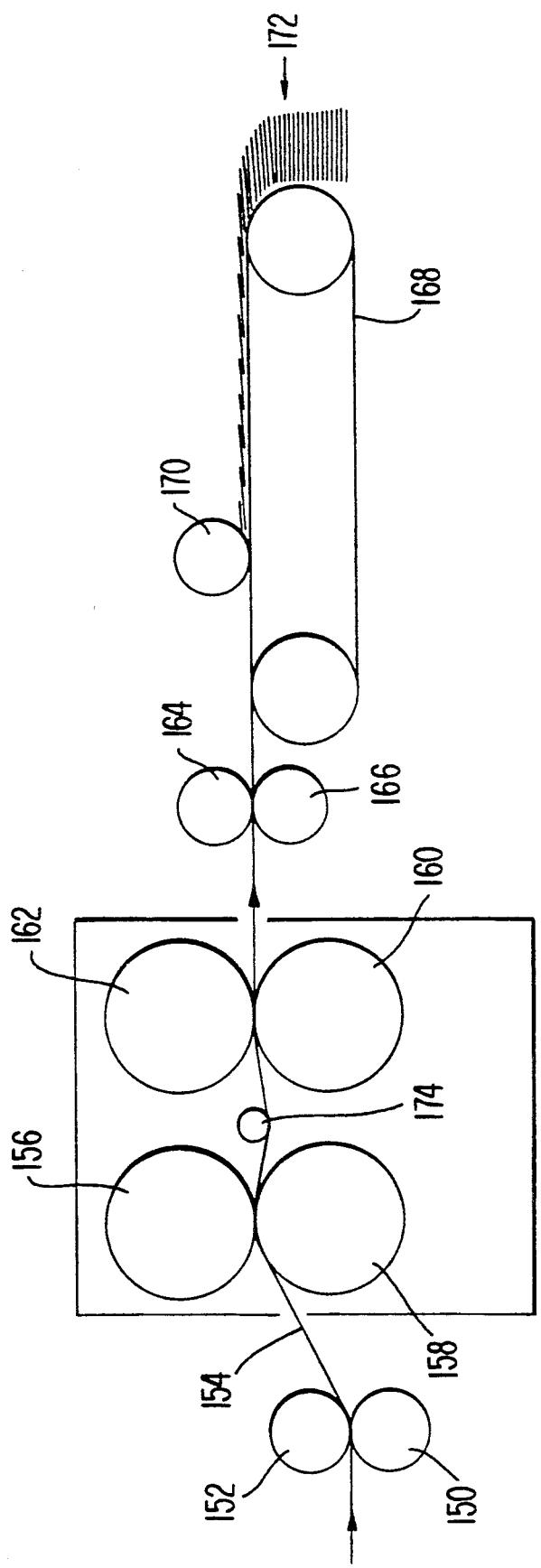

RESISTANCE HEATER FOR A CARRYOUT PIZZA PACKAGE OR OTHER FOOD ITEMS

TECHNICAL FIELD

The invention relates to heating devices and more particularly to heaterboards in which an electrical resistance heating circuit is formed in a conductive layer of a laminate.

BACKGROUND

Carry-out and/or delivered fast food continues to enjoy widespread success due to the convenience associated with foods which are prepared in restaurants and may be enjoyed in the comfort of the customer's own home. Conventionally, food products such as pizzas are placed in a carton or box for transport to the home or office for consumption. Particularly with delivered fast foods, the food container may also be placed in an insulating pouch to prevent cooling of the food. However, even an insulating pouch is often insufficient to prevent cooling where the customer or delivery person must transport the food a substantial distance.

Where a delivery person is making a number of deliveries in a single delivery run, the problem can be particularly apparent due to the elapsed time in making successive deliveries, especially where certain addresses are difficult to find. Often a large number of pizzas can become cold. When a customer realizes the pizza is cold, the delivery person has usually left, making it difficult for the customer to complain of the cold food, and the customer is apt to select another establishment for their next delivered meal. To avoid cooling of the food, the delivery runs may be limited to one or two deliveries; however, this reduces the efficiency of the delivery operation since additional trips must be made to the restaurant to pick up hot orders.

To solve the above problems, it has been proposed to provide heating devices which may be transported with the prepared food to insure arrival in acceptably heated condition. However, previous attempts have not achieved a heating device which is sufficiently reliable and inexpensive to manufacture.

For example, U.S. Pat. No. 3,721,803 to DiStefano discloses a pizza pie warming carrier in which a plurality of electric resistance wires are sandwiched between fabric coverings of an outer carrier such that a boxed pizza may be placed in the carrier and the boxed pizza is kept warm by the heat generated as electricity is passed through the wires. However, manufacture of such a device can be expensive due, in part, to the difficulty in properly positioning the wires within the carrier. In view of the expense, such a device is only cost effective for use as a reusable carrier for holding pizza boxes therein. In addition, in the DiStefano arrangement, portions of the carrier adjacent the heating wires may become overheated, while areas between the wires may not be sufficiently heated. Thus, a further difficulty with the DiStefano arrangement is in providing an evenly distributed heated surface such that sufficient heat may be transferred, without risking localized overheated portions.

U.S. Pat. No. 2,971,073 to Eisler discloses an electric surface heating device in which a metal foil forms a resistance heating device as electricity is passed therethrough. In the '073 patent, a circuit pattern is formed in the metal foil by placing a stencil over the metal foil and utilizing an abrasive brush to strip away portions of the metal foil leaving a zig-zag or meandering circuit pattern which forms the heating element. However, due to the somewhat crude nature in removing the foil to form the circuit pattern, a large amount of foil is removed, thereby reducing the effectiveness of the heating element, and also leaving large areas unheated. The '073 Eisler device is thus unsuitable for use as a heaterboard in warming food products, since it is difficult to properly distribute the heat in the heating device. When heating or maintaining warmness of a pizza, the heated surface aids in maintaining crispness of the pizza crust. Where large areas of a heating device are unheated, soggy crust portions can develop due to the grease and moisture associated with the pizza. Moreover, since a large amount of the foil is removed, the effective area of the heating device is reduced and the power per unit area of the heater which is transferred in the form of heat is also reduced. The Eisler heating device is disclosed as particularly suitable for use in heated wallpaper arrangements and would not appear desirable as a food warming device.

U.S. Pat. Nos. 3,020,378 and 3,483,358 to Eisler disclose metal foil heating elements for use in packages in which the metal foil is cut to form a meandering circuit path in the foil prior to lamination to a substrate. After cutting, the foil is deformed to change the surface dimensions of the foil to open up the cuts to define the electric circuit; however, due to the thinness of the foil, the foil can be broken during deformation and, without the deformation, the cuts may close up forming short circuits in the circuit pattern. Moreover, when the foil is cut, handling is more difficult since the foil is even more fragile after cutting and more subject to deformation as a result of forces incurred in feeding the foil. Since the foil is more difficult to handle, it is also more difficult to place the foil on a substrate in proper registration, such that the cut portions do not contact to form short circuits.

In U.S. Pat. No. 3,026,234 to Eisler, a meandering circuit path is cut in a metal foil and an insulating layer is interleaved or interwoven with the cut foil to insure insulation between adjacent cut portions, thereby preventing short circuiting of adjacent cut portions. However, as in the above Eisler devices, handling of the thin cut foil is difficult and thus placement of an insulating sheet such that it is interwoven with the cut foil is difficult, and risks breaking or tearing of the foil which could create an open circuit rendering the heating device inoperative.

Thus, a heating device which is reliable in providing properly distributed heat and which is inexpensive to manufacture is needed.

SUMMARY OF THE INVENTION

It is therefore an object of the present invention to provide an improved heating device for use in heating food products, particularly for use in containers for carry-out or delivered foods.

It is another object of the invention to provide a heating device which is inexpensive to manufacture such that the heating device may form part of a disposable container.

It is another object of the invention to provide a heating device having a circuit pattern which can be configured to achieve a variety of heating profiles.

It is yet another object of the invention to provide a heaterboard in which the heating element is formed of a cut foil layer in which short-circuiting of the heating circuit path is prevented.

It is a further object of the invention to provide a heaterboard in which handling of the heating element is eased by cutting a circuit pattern in the foil after the foil is bonded to a substrate.

It is a still further object of the invention to provide an improved method and apparatus for forming heaterboards in which a heating circuit is cut in a heating element layer of a laminate such that short-circuiting of the heating element is prevented and in which the cutting is precise to allow various circuit patterns to be cut into the layer to achieve a variety of heating profiles.

These and other objects and advantages of the present invention are achieved in the present invention in which a thin foil layer is bonded to a paperboard substrate and a circuit pattern is cut in the foil, such that a circuit path is defined between the cuts in the foil. The foil is extremely ductile even at low temperatures, and thus, cutting alone would not form a sufficient barrier between adjacent cut portions to prevent short-circuits. Therefore, in accordance with the present invention, scores or ridges are provided to insure separation of the circuit at the cut portions of the foil. In a first form of the present invention, after cutting of the foil circuit pattern, the laminate is reverse scored or in other words, is scored on the side opposite the substrate side having the foil layer. The score spreads the substrate and foil at the cut scores, thereby insuring separation between adjacent cuts and preventing short-circuiting which may be caused by contaminants or flow of the foil within the cut.

In a second form of the invention, the foil and substrate laminate is embossed prior to cutting of the circuit, and short-circuiting is insured by utilizing a skiving knife to remove the raised portions, leaving the foil between the embossed portions defining a circuit path for the heating element. Particularly, in the first-mentioned form above, the present invention allows for precise cutting of a circuit pattern and for substantially complete utilization of the foil layer forming the resistance heater, such that precise circuit patterns may be formed to provide any desired heating profile. Since substantially all of the foil is utilized, most of the heaterboard is producing heat such that localized cold and hot spots are prevented. In addition, since the foil is cut after association with the substrate, handling is simplified and problems involved with handling cut, thin foil are eliminated. The heaterboard may be formed as an insert which may be placed inside a food carrying container, such as a pizza container; or in an insulating pouch which holds the food container. The heaterboard may also be formed integrally with the food carrying container or container carrying pouch. The heaterboard may be reusable, however can be formed inexpensively such that it may be disposed after each use. Since the heaterboard is inexpensive, it may be placed closely adjacent greasy foods, such as pizza, and the grease is not a problem since the paperboard heater is simply disposed of after use.

In the apparatus for forming the heaterboard, a continuous web of the laminate structure comprising the paperboard substrate and resistance heating foil layer is conveyed past a cut score roll which cuts the circuit pattern in the resistance heating foil layer. The web is then conveyed past a scoring roll which scores the circuit pattern underneath the web (i.e., on the side of the laminate opposite the side having the heating foil thereon) such that the cut portion is spread and short-circuiting at the cut portions is prevented. The web is then separated between adjacent circuits to provide individual heaterboards, each having the predetermined resistance heating circuit thereon. The cutting and scoring rolls are geared together to insure proper registration of the cutting and scoring operations. In addition, the cut score roll may be of a slightly larger diameter such that the cut score roll is moving at a slightly greater peripheral speed than the web to further aid in separation of the cuts. In addition, a web deflector idler roll may be provided between the cutting roll and the scoring roll to further increase the tension on the resistance heating foil layer, thereby further improving the separation at the cut.

The above, as well as other objects and advantages of the present invention will be realized from the following detailed description of the invention read in conjunction with the drawings.

BRIEF DESCRIPTION OF THE DRAWINGS

FIGS. 5A-5F illustrate circuit patterns which may be formed in accordance with the present invention; and FIG. 6 illustrates an apparatus for forming heaterboards in accordance with the present invention.

DESCRIPTION OF THE PREFERRED EMBODIMENTS

Figure 1:
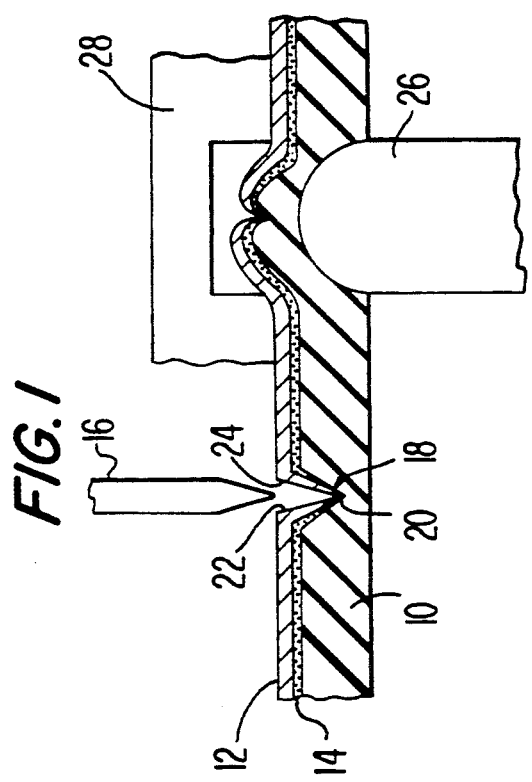
FIG. 1 illustrates a side view representive of the circuit cutting method for forming heaterboards in accordance with the present invention.

As shown representatively in FIG. 1, in accordance with the present invention, a paperboard substrate 10 is provided with a resistance heating layer 12 which is bonded to the substrate by an adhesive 14. The resistance heating layer 12 is preferably a metal foil, such as aluminum, having a thickness on the order of, for example 0.00028-0.00035 inches. This thickness however is not to be construed as limiting the scope of the present invention, as other thicknesses are possible. In accordance with the present invention, the laminate is first cut scored by scoring means 16 to form scores as shown at 18. The scores form a circuit pattern in the foil layer of the laminate, forming the circuit flow path between the cut scores. However, due to the ductility of the foil, cut scoring alone has been found insufficient to completely separate the foil layer such that after cut scoring, portions of the foil remain in contact, as shown at 20. In addition, foil debris from the cutting operation can also collect in the cut portion forming a connection between edges 22,24 of adjacent portions of the circuit path. When the edges 22,24 are electrically connected, either by the ductility of the foil or contaminants, a short-circuit is formed which results in an unacceptable heaterboard. When a short-circuit is present, portions of the heaterboard can become too hot, causing scorching of the paperboard substrate or the food product, and other portions of the heaterboard are not heated sufficiently such that portions of the food may become cold.

In accordance with the present invention, the cut scored portion of the heaterboard is scored from the underside of the paperboard substrate (i.e., the side opposite the foil side) to spread and separate the foil layer at the cut, thereby insuring a discontinuity along the cut such that a circuit pattern is defined between adjacent cuts and short-circuiting is prevented. As shown in FIG. 1, a scoring rule 26 scores the underside of the substrate in cooperation with a recessed plate or counterplate 28. The portion of the substrate end foil at the cut score is thus spread apart, thereby insuring foil edges 22,24 are electrically separated. The cut score and reverse score form an embossed separation which defines the circuit path.

Figure 2C:
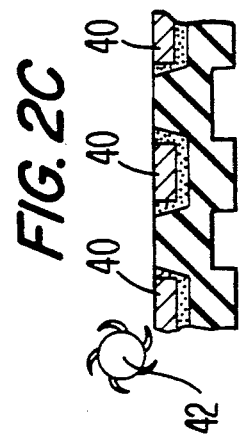
FIGS. 2A-2C illustrate a modified method for forming heaterboard circuits.
Figure 2B:
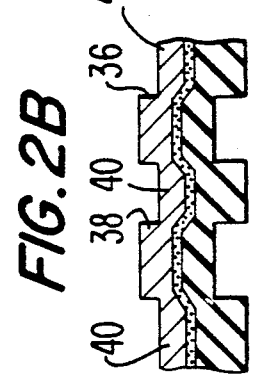
Figure 2A:
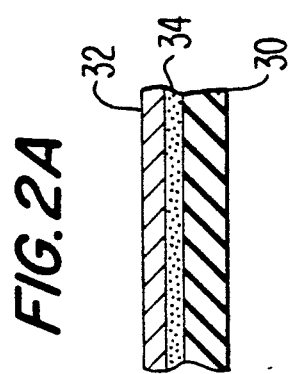

FIGS. 2A–2C show a modified form of the invention in which a paperboard substrate 30 includes a resistance heating foil layer 32 bonded to the substrate by an adhesive 34 as shown in FIG. 2A. As shown in FIG. 2B, the laminate structure is first embossed, creating raised portions as shown at 36,38. The embossed pattern corresponds to the desired circuit pattern of the foil, such that the electrical flow path is defined between the raised portions as shown, for example at 40. To form the discontinuities in the foil, leaving the circuit flow path 40 and avoiding short-circuiting, the raised portions are cut-away using skiving knives 42 to leave the foil forming the circuit flow paths as shown at 40 in FIG. 2C. The embossed portions of FIG. 2 are somewhat exaggerated in width for illustrative purposes, and it is to be understood that the foil portions 40 form a larger surface area compared to the embossed portions 36 which separate adjacent portions of the circuit flow path.

Due to the improved ability to cut circuit patterns in a foil layer of a laminate structure, intricate circuit patterns may be formed which utilize a large proportion of the foil as a heating element and which may form circuit patterns to suit a variety of heating needs. FIGS. 5A–5D illustrate different circuit path arrangements which are attainable with the present invention. As will be recognized by one skilled in the art, the heating is related to the resistance of the circuit and the voltage applied to the circuit. The heaterboards are designed to be connected to a generally low voltage, for example 12 volts, such that a battery or the cigarette lighter outlet of a car may be utilized as the power source. The resistance of the circuit in turn depends upon the thickness of the foil layer, and the length and width of the circuit path. Thus, for a given foil thickness, the resistance of the circuit can be increased by forming a more circuitous (or longer) circuit path. The circuit path also more evenly distributes the heating, such that localized hot and cold spots are avoided.

Figure 5A:
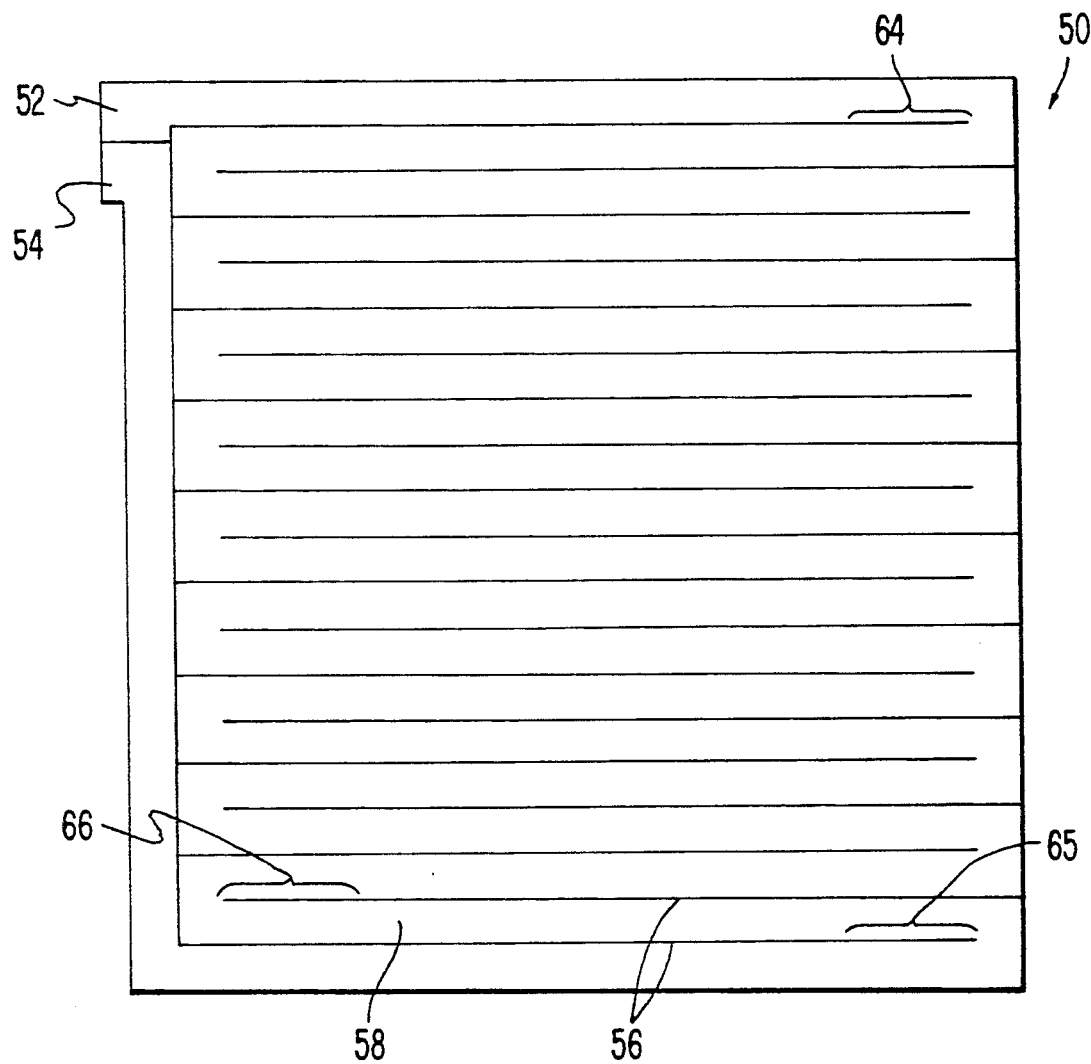

As shown in FIG. 5A, the heaterboard 50 is provided with a serpentine path with end portions 52,54 forming terminals for connection with a power source. The pattern of FIG. 5A forms a substantially even heating surface such that the power (generated in the form of heat) per unit area is substantially the same over the entire heaterboard surface. The lines 56 of FIG. 5A represent discontinuities in the circuit which are first cut scored and then reverse scored as illustrated in FIG. 1. The discontinuities define the circuit flow path therebetween as shown, for example, at 58.

FIG. 5B shows a modification of the circuit pattern of FIG. 5A in which corner portions 60 are blocked from electrical contact with the circuit path such that the corner portions 60 are not heated. The lines 62 represent discontinuities which block the corner portions 60 from electrical contact with the circuit path. This arrangement is suitable where corner heating is not desired, for example, in heating a pizza where the corner portions of the paperboard are not adjacent portions of the food product. As in the arrangement of FIG. 5A, the lines forming discontinuities to define the circuit path 56',62 are formed in accordance with the method of FIG. 1. It is to be understood, that substantially the same result of FIG. 5B may be attained by simply varying the circuit pattern of the FIG. 5A arrangement, such as by shortening the cut portions of the circuit path at the corners. For example, by eliminating the cut portions shown bracketed at 64,65,66 in FIG. 5A, the corner portions will continue to be in the circuit path; however, the power per unit area is reduced and thus the corner portions are not heated to as great of a degree as the remaining portions of the heaterboard circuit.

Figure 5C:
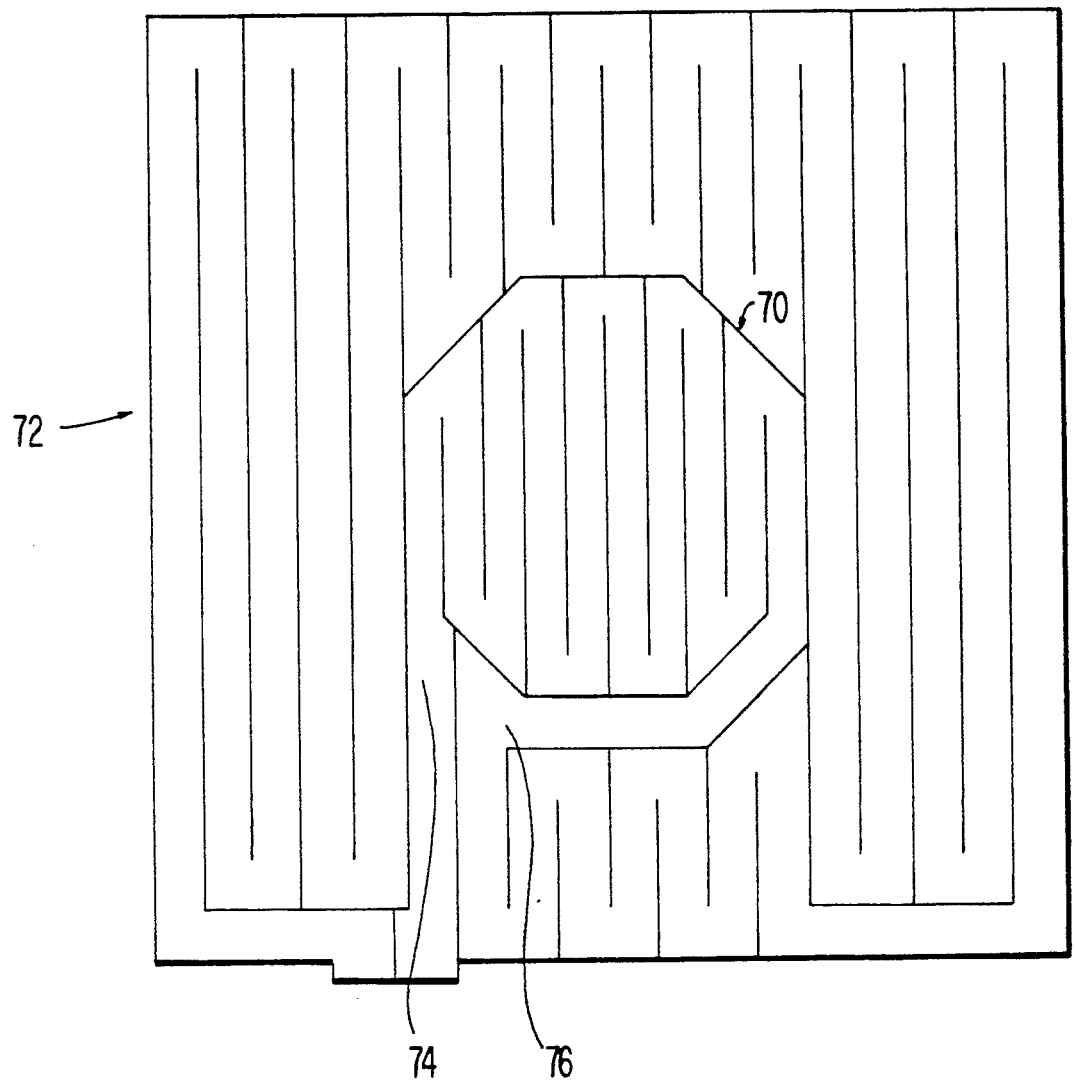
Figure 5D:
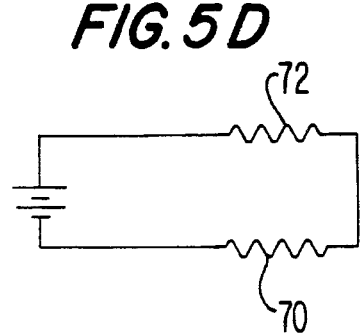

Often, it is desirable to heat a central portion to a higher temperature than the peripheral portions. For example, when heating a pizza, often the central portion of the bottom of the pizza can become soggy due to the grease and other moisture associated with the pizza. To maintain the crispness of the pizza, the heaterboard can include a central portion which is heated to a higher temperature. As shown in FIG. 5C, a central portion is formed with slightly narrower paths than the remaining portion of the heaterboard. The narrower paths form an area 70 in which the resistance density (i.e., the resistance per unit area of the heaterboard surface) is greater than the remaining portions of the heaterboard. Since the resistance density is greater, and the central portion is connected in series (as shown at 74,76) with the remaining portions of the circuit path 72, a greater amount of power per unit area is generated. Since the current is substantially constant in a series circuit, the $I^2R$ power generated per unit area in the central portion is greater than the power per unit area generated in the outer areas. If desired, the corner portions of the heaterboard of the FIG. 5C may be modified to be isolated from the circuit path as shown in FIG. 5B or may be heated to a reduced temperature, as discussed in conjunction with FIG. 5A. The circuit of FIG. 5C is shown schematically in FIG. 5D with the outer portions of the circuit path shown at 72 in series connection with the inner portion 70. The arrangement of FIG. 5C was designed with a target temperature of 130° F. in the outer portions and 152° F. in the central portion.

Figure 5E:
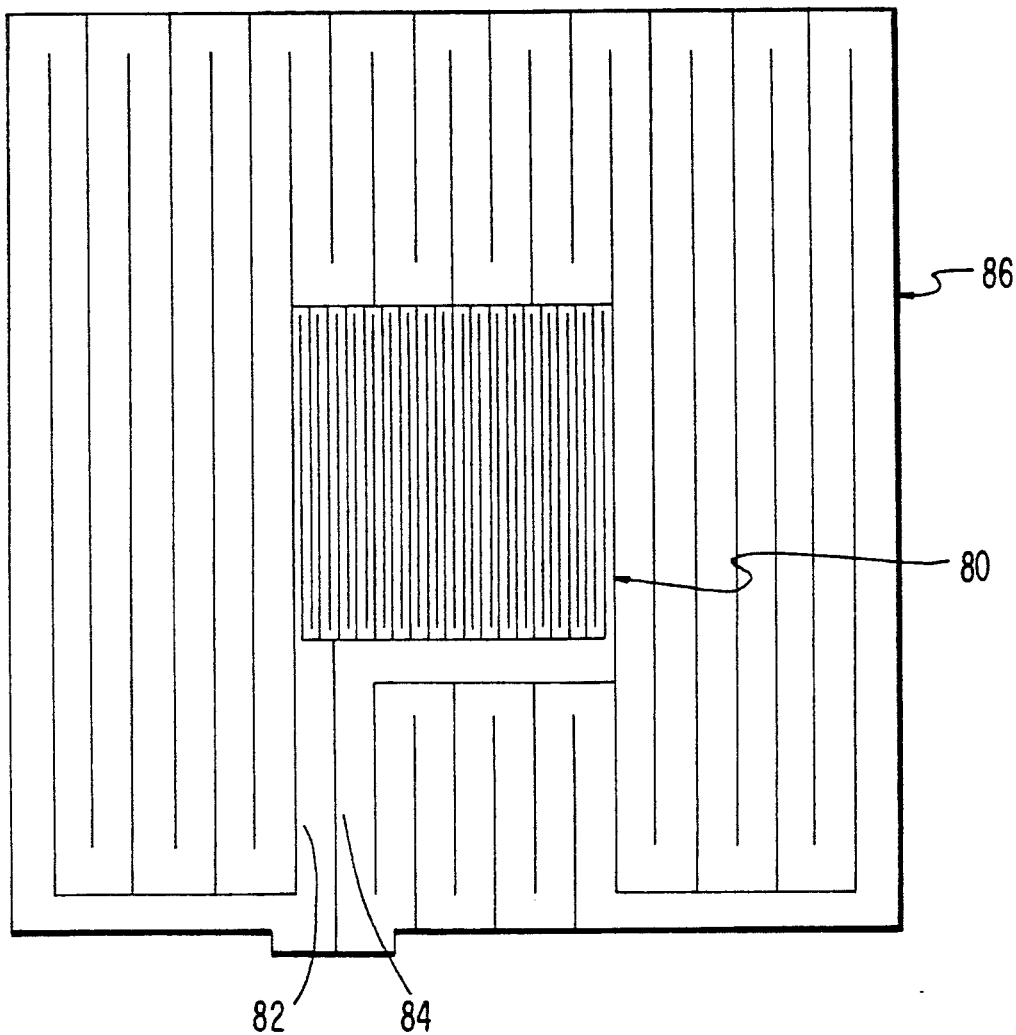
Figure 5F:
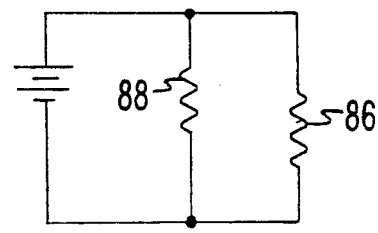

FIG. 5E illustrates a circuit pattern in which a central portion 80 is connected in parallel as shown at 82,84, with the remaining portions 86 of the circuit. The circuit pattern of FIG. 5E was designed with a target outside temperature of 131° F. and an inside temperature of 168° F. The circuit of FIG. 5E is shown schematically in FIG. 5F. In the parallel connection, the voltage drop across the inner portion 82 is the same as the voltage across the outer portions 86. Thus, as the resistance in the inner portion is reduced, the current in the inner portion rises (for a constant voltage) and the $I^2R$ heating is increased. Thus, the higher temperatures are attainable with the parallel circuit, and in fact, the inner portion must have a somewhat intricate pattern having a higher resistance density to avoid overheating of the central portion. The pattern of FIG. 5E may also be modified to have cooler corner portions as discussed earlier.

Figure 3A:
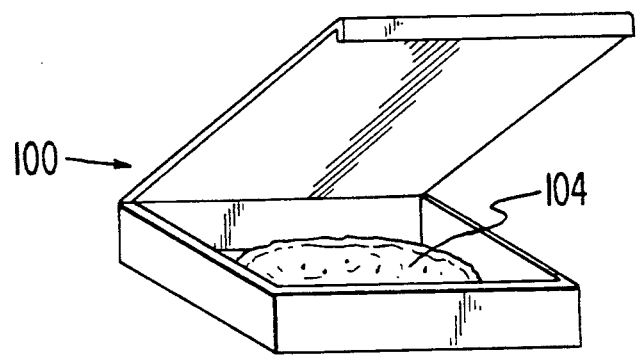
FIGS. 3A-3C illustrate the use of a heaterboard as a container insert.
Figure 3B:
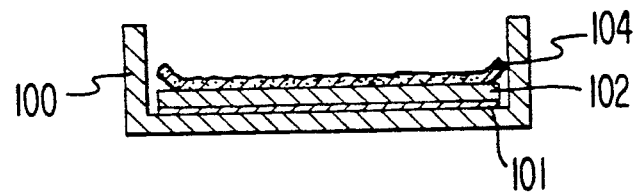

FIGS. 3A and 3B show a heaterboard formed in accordance with the present invention in combination with a container such as a pizza carton 100 with FIG. 3B illustrating a cross-sectional view of the bottom of the carton. In use, the heaterboard 102 is inserted into the carton with the paper substrate facing upward and the foil layer 101 facing downward such that the food item, pizza 104, is not in direct contact with the foil layer and the adverse effects of grease and other liquids associated with the food are avoided. The paperboard substrate of the heaterboard 102 absorbs the liquids and can be disposed of with the container 100. If desired, an additional liquid impervious layer may be coated onto the substrate to avoid adverse effects of the grease, however, the paperboard substrate alone is generally sufficient for reasonable travel times. For best results, the carton and heaterboard are placed in an insulating pouch for delivery.

If desired, a heaterboard may be placed above the food product, in addition, or in lieu of the use of a heaterboard underneath the food product. The heaterboard may also be formed to surround the sides of the food article(s) for example by bending a heaterboard to fit along the container sidewalls. Such an arrangement would generally be suitable for foods other than pizza, such as fast foods carried in bags.

Figure 3C:
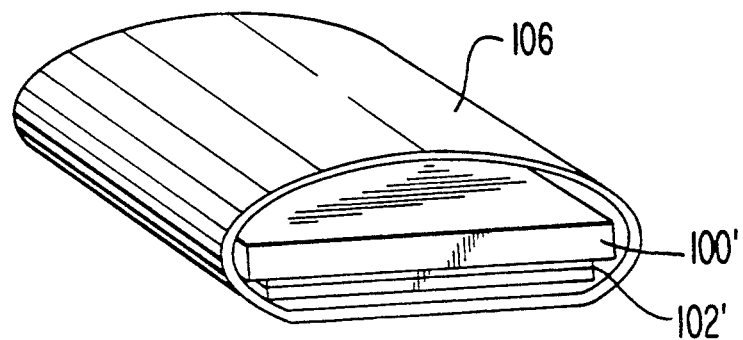

If it is desired to reuse the heaterboard, more durable materials may be utilized as the heaterboard substrate or the heaterboard laminate may be coated with liquid impervious materials. The heaterboard may also be placed outside of the pizza carton, for example as shown in FIG. 3C. In FIG. 3C, the heaterboard 102' is placed outside of the carton with both the carton and the heaterboard within an insulating pouch 106. The heaterboard heats the interior of the insulating pouch or bag 106 and thus maintains the temperature of the prepared food within the carton 100'. The FIG. 3C arrangement is particularly suitable if it is desired to reuse the heaterboard, since the heaterboard can be maintained out of contact with the food product. It is to be understood that if desired, the heaterboard could be formed within a wall of the pouch 106, or alternatively, a pocket may be formed in the pouch 106 for insertion of a heaterboard.

Figure 4A:
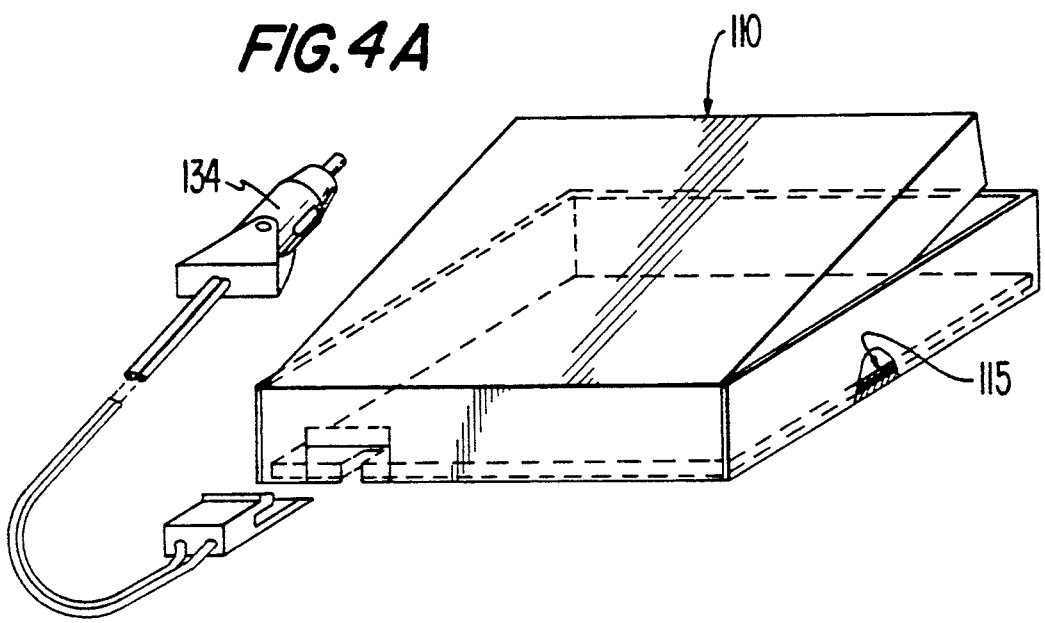
FIGS. 4A and 4B illustrate a heaterboard formed integrally with a food carrier.
Figure 4B:
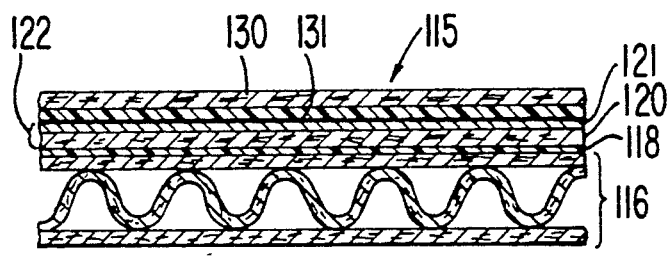

FIGS. 4A and 4B show a heaterboard formed integrally with a food carton, such as a bottom wall of a pizza carton 110. A connecting device 134 may be utilized to connect the heaterboard circuit to a power source, such as a vehicle cigarette lighter, in a known manner, for example as disclosed in U.S. Pat. No. 4,134,004. FIG. 4B shows a cross-section of the bottom of the carton 110 as shown at 115 of FIG. 4A. The carton bottom includes a corrugated cardboard portion 116 which gives the container structural integrity and upon which the heaterboard 122 is adhered as by a polyethylene adhesive 118. The paperboard substrate 120 includes a metalized layer 121 having a desired circuit path formed therein in accordance with the present invention (FIGS. 1 and 2). A paperboard layer 130 is adhered (by adhesive 131) to the top of the heaterboard to prevent direct contact of the foil layer with the food, thereby preventing direct contact of the foil layer with grease or other undesirable liquids. Alternatively, the top paperboard 130 may be eliminated and the heaterboard adhered to the corrugated cardboard 116 with the foil layer down such that the paperboard substrate of the heaterboard protects the foil layer from the food product. It is to be understood that the arrangement of FIG. 4A and 4B is merely an example of the use of a heaterboard formed integrally with the container in accordance with the present invention; however, other arrangements are possible. For example, the heaterboard may form a heating element in the sidewalls or top wall of the carton in addition or in lieu of the use of the heaterboard in the bottom. In addition, liquid impervious layers may be formed in the carton to further prevent access of grease to the heaterboard circuit. The heater may also be made integral with a bag wall, or other containers utilized in transporting prepared foods.

FIG. 6 illustrates an apparatus for use in forming heaterboards in accordance with the present invention. The apparatus includes a pair of feed rolls 150,152 which feed a web 154 of the laminate which includes a paperboard substrate and a resistance heating foil with the foil side up. The web is fed past a crush cut roll or cut score roll 156 which includes scoring knives arranged in a pattern corresponding to the desired circuit pattern of the heaterboard. An anvil roll 158 is provided to support the web during cutting. The web is then fed past a male scoring roll 160 and female roll 162. The male scoring roll has scoring rules thereon corresponding to the desired circuit pattern and the female roll includes recesses corresponding to the circuit pattern such that the cut scored circuit pattern is reverse scored, as representatively shown in FIG. 1. Preferably, the web includes perforations between adjacent circuit boards to form a line of weakness such that speed-up rolls 164,166 will burst separate the leading circuit board from the web. It is to be understood, however, that other known cutting devices (such as reciprocating cutters) may be utilized for cutting and separating adjacent heaterboards. After separation, the heaterboards are fed by a conveyer 168 and are placed in shingled relation by a shingling roll 170. A stack of completed heaterboards are then formed at the end of the conveyer at 172.

The rolls and the apparatus of FIG. 6 are geared together to maintain proper registration of the cut scoring and reverse scoring operations. The rolls may also be controlled for proper registration by other means, for example, by an electronic control device. In accordance with another aspect of the invention, the cut score roller 156 can be formed of a slightly larger diameter than the remaining rolls, such that the peripheral speed of the roll is slightly greater than the web feed speed. In this arrangement, a slight relative movement between the cutting knives and the web further improves the ability of the cutting knives to separate the foil portions at the cut by virtue of the movement of the cutting blade while in contact with the foil during cutting. In a similar fashion, the cut score roller can also be formed to have a smaller diameter than the remaining rolls, to have a slightly slower peripheral speed, to produce the relative movement.

In addition, a web deflector idler roll 174 can be provided to slightly deflect the web path. The deflection increases the surface tension of the foil to further aid in separation of the foil at the cut scores to define the circuit path. The use of cut score cylinders and reverse score cylinders is advantageous in properly registering the cut scores and reverse scores; however, it is to be understood that reciprocating die cutting and reverse scoring may also be utilized. Furthermore, if desired, pre-cut heaterboards may be fed in lieu of a continuous web; however, proper feeding and registering is easier where the heaterboards are separated after the cut scoring and reverse scoring operations.

INDUSTRIAL APPLICABILITY

The invention has particular utility in heating or maintaining warmness of prepared food products during or, while being held waiting for transport. The heaterboards may be utilized as an insert for food containers or may be formed integral therewith. The heaterboard may also be placed outside of a container to maintain warmness of the food product within the container. The heaterboards may be formed inexpensively such that they may be discarded after each use, however, if desired, the heaterboards may also be reused, and can be formed utilizing durable substrate materials (such as plastics) for extended use. Due to the improved cutting operation, substantially the entire area of the heaterboard can be utilized as a heating surface, and intricate patterns can be formed to achieve a variety of desired heating profiles.

While various forms and embodiments of the present invention are disclosed herein, it is to be understood that various modifications are possible within the scope of the present invention. For example, variations in the size and shape of the heaterboard substrate, or in the circuit path formed thereon are possible within the scope of the present invention. While substantially rectangular heaterboards are described herein, the use of circular (hexagonal, octagonal, etc.) heaterboards with circular (or other) circuit paths are also contemplated. The materials utilized in forming the heaterboard may also be varied as would be understood by those skilled in the art.

We claim:

1. A heaterboard for use in warming or maintaining warmness of food products comprising:
    a substrate having top and bottom surfaces;
    heating means for converting electrical energy into heat energy, said heating means including a resistance heating layer laminated to one of said top and bottom substrate surfaces; and
    embossed separation means for defining a circuit path in said heating means, said embossed separation means including scores formed on the other of said top and bottom substrate surfaces to form raised portions of said substrate and portions of said heating layer corresponding to, and directly opposite, said scores on the side of said substrate having the resistance heating layer laminated thereon, said raised portions defining a pattern of discontinuities in said resistance heating layer coextensive with said raised portions such that a circuit path is formed between said discontinuities.

2. The heaterboard of claim 1, wherein said discontinuities of said embossed separation means includes severed portions forming separations in said resistance heating layer, and said raised portions comprise portions of said substrate which are scored on the other of said top and bottom substrate surfaces.

3. The heaterboard of claim 1, wherein said discontinuities of said embossed separation means include scraped portions in which portions of said resistance heating layer on said embossed portions are removed defining said circuit path.

4. The heaterboard of claim 1, wherein said circuit path includes a pair of end terminals for connection to a voltage source, said circuit path including a central portion and peripheral portions surrounding said central portion, said central portion having greater power transfer in the form of heat per unit area of the heaterboard than said peripheral portions such that said central portion becomes hotter than said peripheral portions when a voltage is connected to said terminals.

5. The heaterboard of claim 4, wherein said central portion is connected in series with said peripheral portions.

6. The heaterboard of claim 4, wherein said central portion is connected in parallel with said peripheral portions.

7. The heaterboard of claim 4, wherein said substrate is substantially rectangular, said peripheral portions of said circuit path further including corner portions having a lower power density than the remainder of said peripheral portions.

8. The heaterboard of claim 1, in combination with carton means for defining an interior food cavity, wherein said heaterboard is inserted within said food cavity.

9. The combination of claim 8, wherein said food cavity includes a bottom surface, and said heaterboard superposes said bottom surface.

10. The combination of claim 9, wherein said heaterboard is oriented such that said resistance heating layer is between said substrate and said bottom surface.

11. The combination of claim 8, wherein said carton means is a pizza carton.

12. The heaterboard of claim 1 in combination with carton means for defining an interior food cavity, said carton means including a plurality of walls, wherein said heaterboard is integrally associated with at least one of said walls.

13. The heaterboard of claim 1, wherein said substrate is formed of paperboard and said resistance heating layer is formed of a metal foil.

* * * * *